(12) United States Patent
Park et al.

(10) Patent No.: US 11,873,548 B2
(45) Date of Patent: Jan. 16, 2024

(54) RESETTABLE GEARS AND MANUFACTURING METHOD THEREFOR

(71) Applicant: Seoul National University R & DB Foundation, Seoul (KR)

(72) Inventors: Eun Soo Park, Seoul (KR); Geun Hee Yoo, Seoul (KR); Kook Noh Yoon, Seoul (KR); Ji Young Kim, Seoul (KR); Wook Ha Ryu, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 14 days.

(21) Appl. No.: 17/486,998

(22) Filed: Sep. 28, 2021

(65) Prior Publication Data

US 2022/0098714 A1 Mar. 31, 2022

(30) Foreign Application Priority Data

Sep. 28, 2020 (KR) .................. 10-2020-0125871

(51) Int. Cl.
*C22C 45/10* (2006.01)
*B22D 19/00* (2006.01)
*B22D 21/02* (2006.01)
*F16H 49/00* (2006.01)

(52) U.S. Cl.
CPC .......... *C22C 45/10* (2013.01); *B22D 19/0036* (2013.01); *B22D 21/022* (2013.01); *F16H 49/001* (2013.01); *F16H 2049/003* (2013.01)

(58) Field of Classification Search
CPC ...................................................... F16H 55/06
See application file for complete search history.

(56) References Cited

U.S. PATENT DOCUMENTS

| 6,623,566 | B1 * | 9/2003 | Senkov | C22C 45/003 148/403 |
| 8,293,036 | B2 * | 10/2012 | Branagan | C22C 33/0285 148/403 |
| 2005/0263216 | A1 * | 12/2005 | Chin | C22C 45/02 148/304 |
| 2010/0084052 | A1 * | 4/2010 | Farmer | C23C 28/324 427/591 |
| 2010/0263766 | A1 * | 10/2010 | Saw | B22F 9/04 148/403 |
| 2010/0269960 | A1 | 10/2010 | Hertz | |

(Continued)

FOREIGN PATENT DOCUMENTS

| EP | 3695920 A1 * | 8/2020 | ............... B22C 3/00 |
| JP | 10296424 | 11/1998 | |

(Continued)

*Primary Examiner* — Bobby Rushing, Jr.
(74) *Attorney, Agent, or Firm* — LEX IP MEISTER, PLLC

(57) ABSTRACT

Disclosed is a gear including a resettable metallic glass. The gear of the present disclosure includes, as a base material, a resettable metallic glass, wherein the resettable metallic glass includes at least one metal element selected from each of (a) the group consisting of Ti, Zr, and Hf and (b) the group consisting of Fe, Co, Ni, Cu, and Zn, and further includes at least one metal element to maximize the complexity in the thermodynamic enthalpy of mixing among constituent elements, thereby including multiple resetting cores in various atomic-scale cluster forms in an amorphous matrix, leading to a structure with maximized structural complexity.

5 Claims, 13 Drawing Sheets

(56) References Cited

U.S. PATENT DOCUMENTS

| | | | |
|---|---|---|---|
| 2013/0213199 A1 | 8/2013 | Aiso et al. | |
| 2013/0333814 A1 | 12/2013 | Fleury et al. | |
| 2016/0201176 A1* | 7/2016 | Saw | C22C 33/003 |
| | | | 75/352 |
| 2020/0096031 A1* | 3/2020 | Stevick | F16B 19/1063 |

FOREIGN PATENT DOCUMENTS

| | | | | |
|---|---|---|---|---|
| JP | 2005273010 | | 10/2005 | |
| JP | 5604470 B2 | * | 10/2014 | C22C 45/10 |
| JP | 2019014968 A | * | 1/2019 | |
| KR | 20100095456 | | 8/2010 | |
| KR | 20130063026 | | 6/2013 | |
| KR | 20130110689 | | 10/2013 | |
| KR | 20130142467 | | 12/2013 | |
| KR | 20140130388 | | 11/2014 | |
| KR | 20160089746 | | 7/2016 | |
| KR | 20180091602 | | 8/2018 | |
| KR | 20180092012 | | 8/2018 | |
| KR | 20190109004 | | 9/2019 | |
| KR | 20200104080 | | 9/2020 | |
| WO | WO-2005017223 A1 | * | 2/2005 | C22C 45/02 |
| WO | WO-2020050851 A1 | * | 3/2020 | |
| WO | WO-2020128170 A1 | * | 6/2020 | B22C 1/00 |
| WO | WO-2020190229 A1 | * | 9/2020 | C22C 1/002 |

* cited by examiner

Non-uniform strain formed toward periphery of
internal liquid-like region due to relative contraction/expansion

FIG.10A
FIG.10B
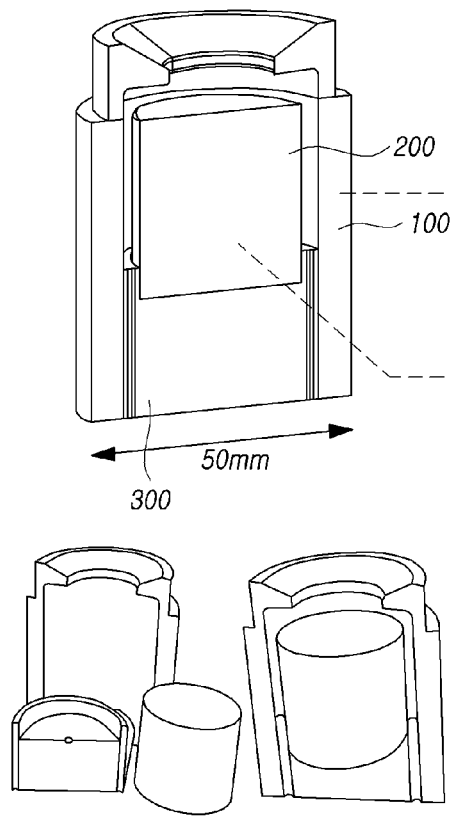
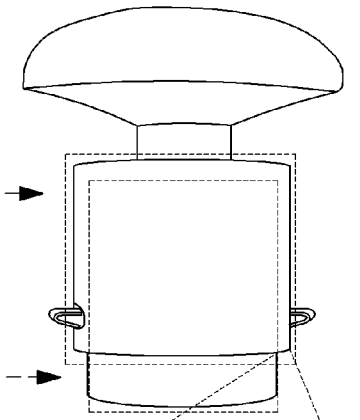
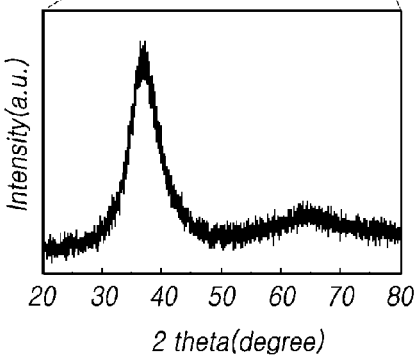

RESETTABLE GEARS AND MANUFACTURING METHOD THEREFOR

CROSS REFERENCE TO RELATED APPLICATION

This application claims priority from Korean Patent Application No. 10-2020-0125871, filed on Sep. 28, 2020, which is hereby incorporated by reference for all purposes as if fully set forth herein.

BACKGROUND OF THE INVENTION

1. Field of the Invention

The present disclosure relates to resettable gears and manufacturing method therefor. Specifically, resettability refers to the property that a material returns to the initial microstructure to have increased lifespan by healing through resetting treatment of micro-detect regions formed in the use environment, and the present disclosure provides the application of a resettable metallic glass to gears to increase lifespan thereof.

2. Description of the Prior Art

Gears are used in various mechanical parts to transmit force from a driver to an actuator. Especially, the parts associated with such gears are known to be vulnerable to fatigue deformation since they are mainly utilized in an environment in which stress is repeatedly operated, in the use environment. However, high-strength materials are difficult to use for precision machining for teeth or the like, and thus it is general to achieve long lifespan by a method whereby low-grade materials, such as S45C steel, are processed and then the surface strength thereof is increased by post heat-treatment, such as carburizing.

Meanwhile, metallic glasses have excellent mechanical properties, which are distinguished from crystalline alloys, due to disordered atomic arrangements such as a liquid-like structure, and bulk metallic glasses are known to have a large fracture strength of about 1 GPa and an elastic limit of about 1.5% or more and thus are new materials that are highly applicable as high-quality structural materials. Especially, the use of bulk metallic glasses can obtain ultra-high strength materials as well as achieve weight lightening products due to high specific strength, and the bulk metallic glasses are composed of uniform microstructures without grain boundaries and the like and thus have high corrosion resistance and wear resistance. It was also reported that metallic glasses, when undergoing post-treatment by severe plastic processing or thermo-cycling, induce internal stress changes, thereby enabling structure recovery through the local stress-induced expansion, leading to an improvement in toughness. However, typical metallic glasses have ultra-high strength, but exhibit a brittle fracture tendency with little ductility at the glass transition temperature ($T_g$) or less, shows glass transition behavior with the viscous flow at a low temperature of about 60% or less of the melting temperature, and is difficult to allow processing or the like due to easy to crystallization, and the compositions of existing developed alloys do not secure the resettability to allow recycling, and thus are restricted in a wide range of utilization.

Therefore, there is a need for technology development to overcome those conventional technical limits and develop long-life gears and related parts utilizing metallic glasses.

PRIOR ART DOCUMENTS

Patent Documents (Patent Document 1) Korean Patent Registration No. KR101954757B1, Gear manufacturing methods and gears manufactured thereby (Patent Document 2) Japanese Patent Registration No. JP6177327B2, Wave gear device

SUMMARY OF THE INVENTION

An aspect of the present disclosure is to provide gears containing resettable metallic glasses.

Another aspect of the present disclosure is to provide gears having strength, modulus of elastic deformation, resilience, and fatigue lifespan characteristics improved compared with the conventional gears.

In accordance with an aspect of the present disclosure, there is provided a resettable gear. The gear includes, as a base material, a resettable metallic glass, wherein the resettable metallic glass includes at least one metal element selected from each of (a) the group consisting of Ti, Zr, and Hf and (b) the group consisting of Fe, Co, Ni, Cu, and Zn, and further includes at least one metal element to maximize the complexity in the thermodynamic enthalpy of mixing among constituent elements, thereby including multiple resetting cores in various atomic-scale cluster forms in an amorphous matrix, leading to a structure with maximized structural complexity.

According to an exemplary embodiment of the present disclosure, in the metallic glass, the ratio of the element of the element group (a) to the element of the element group (b) may be 15 to 66.6 at. % to form an amorphous structure, and the metallic glass may further include at least one species of element selected from (c) the element group consisting of Mg, Sc, Y, La, Ce, Pr, Nd, Sm, Gd, Dy, Ho, and Er, at 5 at. % or less.

According to another exemplary embodiment of the present disclosure, the ratio of the element of the element group (a) to the element of the element group (b) may be 15 to 66.6 at. % to form an amorphous structure, and the metallic glass may further include at least one species of element selected from (d) the element group consisting of Be, B, Al, V, Mn, Ga, Ag, In, Sn, Pb, and Bi, at 15 at. % or less.

According to another exemplary embodiment of the present disclosure, the strength of the resettable metallic glass may be 1 GPa or more.

According to another exemplary embodiment of the present disclosure, the modulus of elastic deformation of the resettable metallic glass may be 1.5% or more.

According to another exemplary embodiment of the present disclosure, the resilience of the resettable metallic glass may be 5 MJ/m$^3$ or more.

According to another exemplary embodiment of the present disclosure, the resettable metallic glass may further include at least one species of element from (e) Nb, Mo, Ta, and W, or (f) C, N, Si, P, Ge, Pd, Pt, and Au, at 5 at. % or less relative to the total alloying elements.

According to another exemplary embodiment of the present disclosure, the metallic glass may further include at least one species of element of each of at least three element groups of the element group (c), the element group (d), the element group (e), and the element group (f), to maximize the complexity of the element constitution.

According to another exemplary embodiment of the present disclosure, the resetting process of the gear may be performed by applying external energy to a material, which contains a large quantity of soft spots inside since the gear was already used. The applied energy may include at least one of thermal energy of repeated (temperature rising)–(cooling) cycles, mechanical energy due to the repeated leading, and electric pulse energy.

According to another exemplary embodiment of the present disclosure, the critical point of deformation that is resettable by the resetting treatment (RS-treatment) of the metallic glass may be 75% of the maximum fracture fatigue deformation.

According to another exemplary embodiment of the present disclosure, the resetting treatment of the metallic glass after the RS-treatment thereof may be 50% or more of $\Delta E_c$ ($\Delta E_c$ is a difference between a $\Delta H$ value of the metallic glass immediately after being manufactured and the $\Delta H$ value of measured at the level of 50% of the maximum number of fatigue failure cycles).

According to another exemplary embodiment of the present disclosure, the gear may include parallel axis gears including spur gears, helical gears, and rack gears, intersecting gears including bevel gears and crown gears, and non-parallel and non-intersecting gears including screw gears, helical gears, worm gears, and strain wave gears.

According to another exemplary embodiment of the present disclosure, the forming of the outer shape of the gear (blank gear) may be manufactured by at least one method of: direct casting, such as drop casting, pressure casting, die casting, or centrifugal casting, in which a master alloy manufactured with a target composition was directly poured into a casting mold with a blank gear form; or by thermoplastic forming, such as thermo-forming (heat+mechanical stress) or blow molding (heat+air pressure), in which the base material prepared in an amorphous structure is subjected to forming through pressurization at a temperature not higher than the crystallization temperature and then cooled.

According to another exemplary embodiment of the present disclosure, as for the precise forming of the teeth of the gear, the blank gear, which is the manufactured outer shape part, may be subjected to forming at least one method of a cutting process, such as electric discharging machining or twin-roll processing, or may be subjected to forming through at least one method of thermo-plastic forming, such as blow molding (heat+air pressure) or thermo-forming (heat+mechanical stress).

According to the present disclosure, the base material of the gear has a structure with maximized structural complexity by including multiple resetting cores in various atomic-scale cluster forms in an amorphous matrix, and thus the resetting of after the resetting treatment (RS-treatment) of the amorphous structure is 50% or more of $\Delta E_c$, leading to excellent resettability.

Typical gears have improved properties by a method whereby low-grade materials are processed and then subjected to surface carburizing through heat treatment, but the gears of the present disclosure having as a base material a resettable metallic glass have a high strength of 1 GPa or more, an elastic limit of about 1.5% or more, and a resilience of 5 MJ/m$^3$ or more, and thus provide relatively high strength and excellent elastic resilience, leading to improved durability.

Furthermore, according to the present disclosure, the gear of the present disclosure having as a base material a resettable metallic glass has a fatigue lifespan limit of 1.5 times or more compared with fatigue characteristics of existing materials by healing defect regions, generated during use, through a resetting treatment by the application of simple external energy after a certain period of use, leading to an improvement in use durability limit.

Furthermore, the gears having as a base material a resettable metallic glass having such properties have a great ripple effect on related industries, such as automobiles, nuclear power fields, aerospace, and military industries.

BRIEF DESCRIPTION OF THE DRAWINGS

FIG. 10A and FIG. 10B depict a schematic diagram of a mold for drop casting of flex spline of a strain wave gear utilized as an exemplary embodiment in the present disclosure and an image of the manufactured mold (FIG. 10A), and an image of a casting body immediately after drop casting and X-ray diffraction analysis results (FIG. 10B).

DETAILED DESCRIPTION OF THE EXEMPLARY EMBODIMENTS

Figure 1:
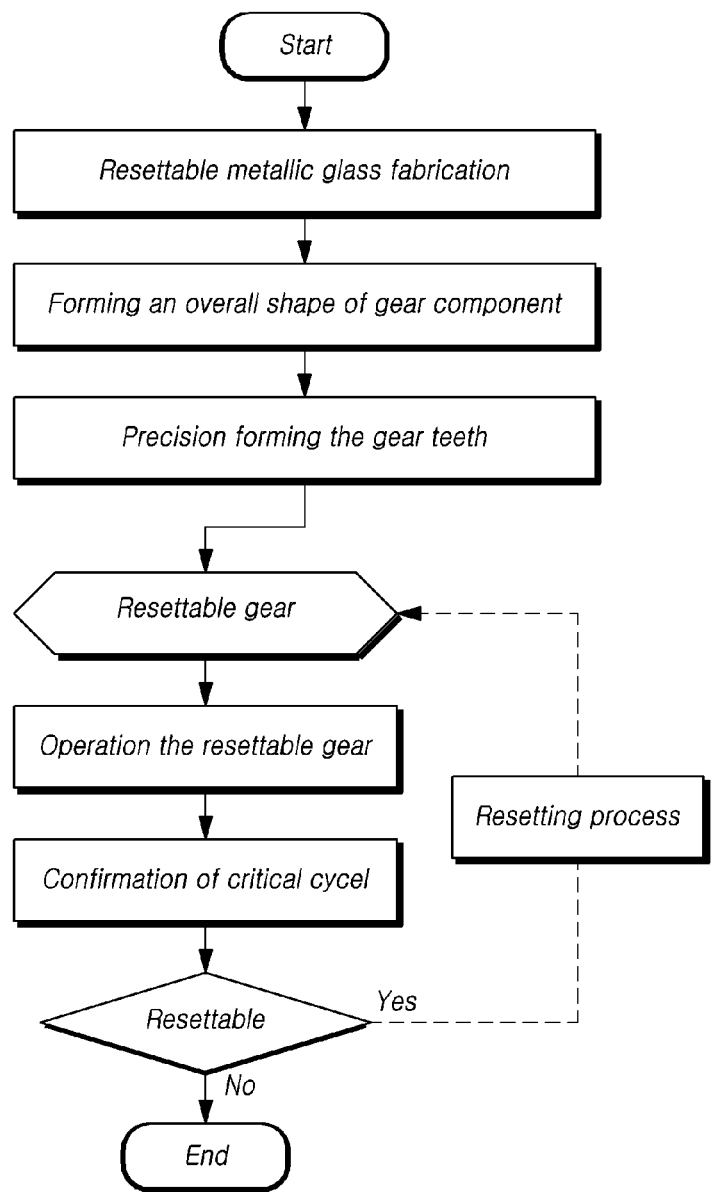
FIG. 1 is a flow chart illustrating a method for manufacturing a resettable gear and a resetting process according to the present disclosure.

Exemplary embodiments of the present disclosure will be described with reference to the accompanying drawings such that those skilled in the art could easily implement the exemplary embodiments described herein. The present disclosure may be embodied in various different forms and is not limited to exemplary embodiments set forth herein. In the drawings, components not relating to the description are omitted in order to clearly describe the present disclosure, and throughout the specification, like reference numerals refer to like elements throughout. In addition, the detailed description of the widely known technologies will be omitted. Throughout the specification, when a component "includes" or "comprises" an element, unless there is a particular description contrary thereto, the component can further include other elements, not excluding the other elements.

The present disclosure relates to resettable gears. Specifically, resettability refers to the property that a material returns to the initial microstructure to have increased lifespan by healing through resetting treatment of micro-detect regions formed in the use environment, and the present disclosure provides the application of a resettable metallic glass to gears and related parts to increase lifespan thereof. FIG. 1 is a flow chart showing a method for manufacturing a gear containing a resettable metallic glass according to the present disclosure and a resetting process. As can be seen from the drawing, the resettable gear of the present disclosure may be manufactured through the steps of: (1) preparing a resettable metallic glass; (2) forming the outer shape of a gear (blank gear); (3) precisely forming teeth of the gear; and (4) optimizing the resettability of the gear. Hereinafter, the steps of manufacturing such a resettable gear will be described in detail.

Preparing Resettable Metallic Glass

Figure 2:
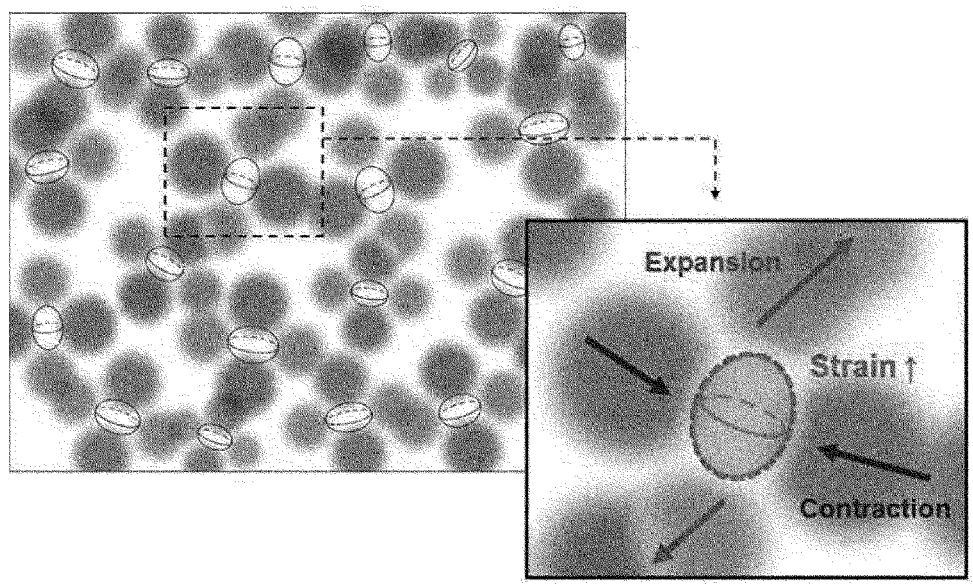
FIG. 2 shows a change in the local stress relationship when an external stimulus (mechanical stress, thermo-cycle, electrical pulse, etc.) is applied to an amorphous structure.
Figure 3A:
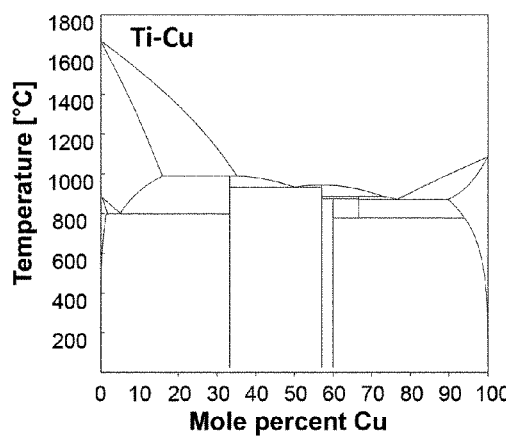
FIG. 3A to FIG. 3D show the results of drawing binary phase diagrams between Ti and Cu (FIG. 3A), Zr and Ni (FIG. 3B), Zr and Zn (FIG. 3C), and Hf and Fe(FIG. 3D) according to the present disclosure.
Figure 3B:
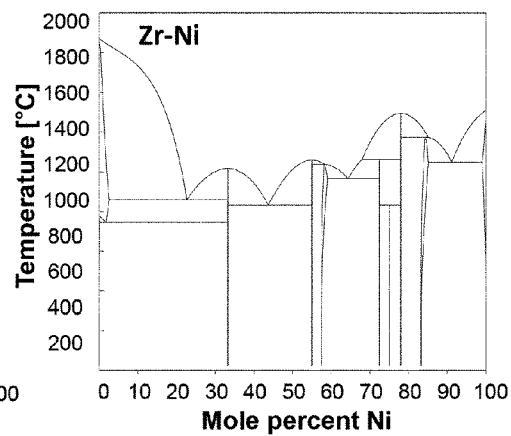
Figure 3C:
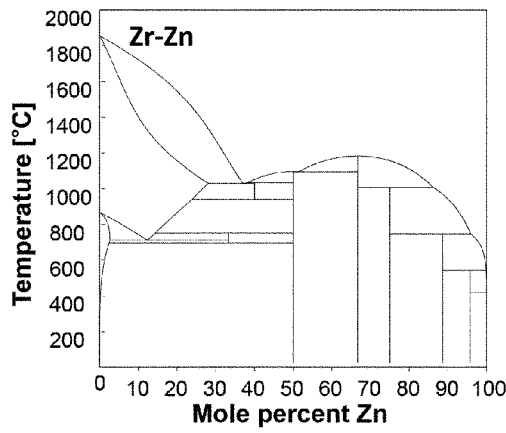
Figure 3D:
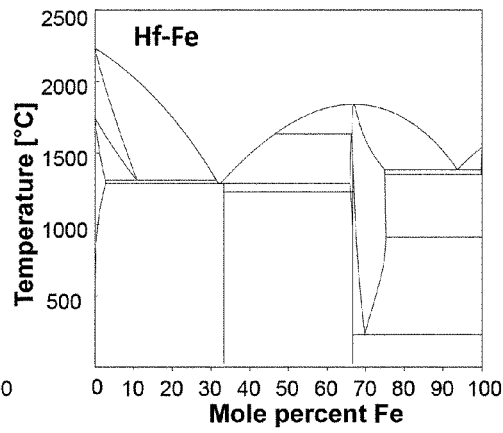

Metallic glass generally refers to one having a disordered atomic arrangement structure without any special crystallographically ordered structure, obtained by melting and fast solidification metal materials. In such a case, both a solid-like region as a dense disordered structure and a liquid-like region as a loose disordered structure are present in the metallic glass. The solid-like region has a dense packing structure in which atoms are present more densely than the liquid-like region serving as a soft spot, and exhibits a more stable amorphous structure. FIG. 2 shows a change in the local stress relationship when an external stimulus (mechanical stress, thermo-cycle, electrical pulse, etc.) is applied to an amorphous structure. As can be seen from the drawing, the dense solid-like regions and the loose liquid-like regions form a locally different deformation fields in the disordered structure while conducting different extents of contraction and expansion from each other, thereby facilitating the recovery to the initial microstructure through the local stress-induced expansion throughout the amorphous structure, leading to the expression of resettability. Therefore, for maximization of such resettability in metallic glasses, the composition design needs to be artificially made so as to form various shapes of atomic-scale clusters by increasing complexity of the enthalpy of mixing among constituent elements in the amorphous matrix. However, metallic glasses generally have main atomic-scale clusters that grow into competing crystalline phases, and the increase of these clusters reduces glass forming ability (GFA), and thus it is not easy to design metallic glasses satisfying both the properties.

First, for designing of a metallic glass enabling the formation of a bulk amorphous structure of 1 mm or more while having multiple atomic-scale cluster resetting cores, the composition range for excellent liquid-phase stability is defined in the present disclosure. To this end, the present disclosure includes at least one metal element selected from (a) the group consisting of Ti, Zr, and Hf as the fourth period transition metals and at least one metal element selected from (b) the group consisting of Fe, Co, Ni, Cu, and Zn as the 3d transition metals, wherein the two selected metal elements form a deep eutectic reaction.

A wider range of the composition having amorphous forming ability is more preferable. The reason is that a too narrow composition range cannot lead to a sufficient amorphous forming ability and makes it difficult to improve properties varied depending on the composition. FIG. 3A to FIG. 3D show the results of drawing binary phase diagrams between Ti and Cu, Zr and Ni, Zr and Zn, and Hf and Fe according to the present disclosure. In the present disclosure, the phase diagrams were drawn by utilizing the Thermo-Calc. software, and calculations were made based on the SSOL6 database, which shows the relationship of solid-solution states most favorably. Unless otherwise specified herein, all thermodynamic calculations were considered to be performed under the same conditions. As can be seen from the drawing, the element pairs of the element group (a) and the element group (b) of the present disclosure had a deep eutectic reaction. As described above, Limited composition range with high glass forming ability can be determined by the composition near the eutectic point where the stability of the liquid phase increases during solidification. However, rapid cooling is utilized for the preparation of metallic glasses, and thus the molten liquid phase undergoes non-equilibrium solidification instead of undergoing equilibrium solidification as shown in the drawn phase diagrams. Since non-equilibrium solidification usually begins at the point allowing the maximum solid phase stability (peak point), it is preferable to configure the maximum alloy composition on the basis of the point. Therefore, when the composition range is defined on the basis of the point, the minimum solid solubility and the maximum solid solubility of the element group (b) in the element group (a) may be defined to be 15 at. % and 66.6 at. %, respectively.

In addition to the composition of the structurally stable metallic glass as described above, an alloying element for multiple atomic-scale cluster resetting cores in the amorphous structure is defined for excellent resettability. For the multiple atomic-scale cluster resetting cores as a unique amorphous structure, artificial manipulation needs to be made such that constituent elements have the complex enthalpy of mixing thereamong. In this respect, the resettable metallic glass may contain a cluster-forming element group (c), which has a positive (+) enthalpy of mixing with the element group (a) and a negative (−) enthalpy of mixing with the element group (b), conversely, a cluster-forming element group (d), which has a negative (−) enthalpy of mixing with the element group (a) and a positive (+) enthalpy of mixing with the element group (b).

When the element group (c) is alloyed with a metallic glass containing both (a) and (b), it is considered that both an (a)-(b) cluster resetting core by the constituent alloying elements having a large negative (−) enthalpy of mixing and a (b)-(c) cluster resetting core by (c), which exerts a repulsive force on (a), and (b), on which (c) exerts an attractive force, may be formed, thereby forming one or more, multiple atomic-scale cluster resetting cores. (The aforementioned (a)-(b) and (b)-(c) mean a cluster by binding between the element group (a) and the element group (b) and a cluster by binding between the element group (b) and the element group (c), respectively.) However, when the alloying element has an enthalpy of mixing of +15 J/mol or more with the elements constituting the element group (a) even though satisfying the aforementioned conditions, a two-phase separated microstructure with the interface may be formed due to a strong phase separation tendency, and thus the enthalpy of mixing therebetween is preferably less than +15 J/mol. Furthermore, even when the element group (c) is contained in a content of more than 5 at. %, the cluster growth is promoted to form nano-sized or larger two-phase separated regions, resulting in the deterioration in resettability, and thus the content of the element group (c) is preferably 5 at. % or less. As for the element group (c) defined by such a method through the enthalpy of mixing among constituent elements, at least one species of element selected from the element group consisting of Mg, Sc, Y, La, Ce, Pr, Nd, Sm, Gd, Dy, Ho, and Er may be contained at 5 at. % or less.

When the element group (d) is alloyed, it is also considered that both an (a)-(b) cluster resetting core by the constituent alloying elements having a large negative (−) enthalpy of mixing and an (a)-(d) cluster resetting core by (d), which exerts a repulsive force on (b), and (a), on which (d) exerts an attractive force, may be formed, thereby forming one or more, multiple atomic-scale cluster resetting cores. However, when the alloying element has an enthalpy of mixing of +15 J/mol or more with the elements constituting the element group (b) even though satisfying the aforementioned conditions, a two-phase separated microstructure with the interface may be formed due to a strong phase separation tendency, and thus the enthalpy of mixing therebetween is preferably less than +15 J/mol. Furthermore, even when the element group (d) is contained in a content of more than 15 at. %, the cluster growth is promoted to form nano-sized or larger two-phase separated regions, resulting in the deterioration in resettability, and thus the content of the element group (d) is preferably 15 at. % or less. As for the element group (d) defined by such a method through the enthalpy of mixing among constituent elements, at least one species of element selected from (d) the element group consisting of Be, B, Al, V, Mn, Ga, Ag, In, Sn, Pb and Bi may be contained at 15 at. % or less.

Figure 4:
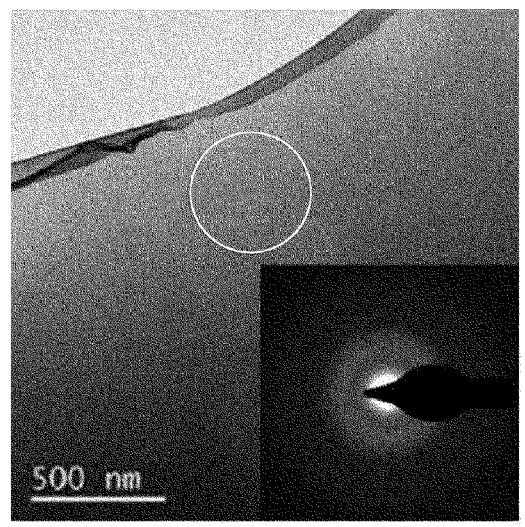
FIG. 4 is a transmission electron microscopy image of Example 1 among the resettable metallic glasses of the present disclosure.

FIG. 4 is a transmission electron microscopy image of Example 1 among the resettable metallic glasses of the present disclosure. Example 1 is an alloy in which the ratio of Zr and Ni was Zr:Ni=62:38 at. % and 15 at. % of Al, Be, or Ag, belonging to the element group (d), was further added thereto in an equal element ratio. As can be seen from the drawing, the metallic glass of the present disclosure shows a clean amorphous image without nano-precipitates on a low magnification image. However, the metallic glasses having multiple atomic-scale cluster resetting cores of the present disclosure were found to have relatively thick selected area diffraction (SAD) pattern compared with typical metallic glasses, which is caused by the induction of the local composition deviation in the formation of an amorphous structure having multiple atomic-scale cluster resetting cores.

Figure 5:
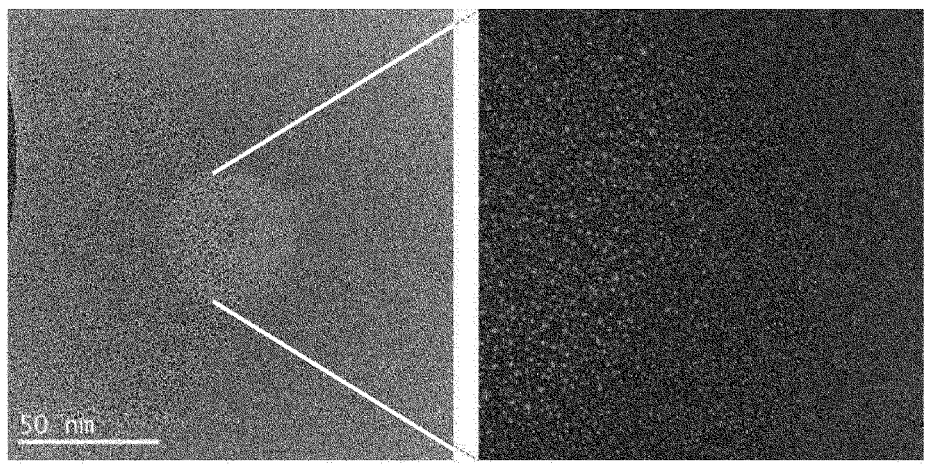
FIG. 5A and FIG. 5B depict high-resolution electron microscopy images showing crystallization behavior when a high energy beam was intentionally focused on the amorphous structure of Example 1 among the resettable metallic glasses of the present disclosure.

FIG. 5A and FIG. 5B depict high-resolution electron microscopy images showing the crystallization behavior when a high energy beam was intentionally focused on the amorphous structure of Example 1 among the resettable metallic glasses of the present disclosure. As can be seen from the drawings, a region of the metallic glass of the present disclosure, on which the high energy beam was not focused, showed a high-resolution image of a typical amorphous structure (FIG. 5B). However, as can be seen from FIGS. 5A and 5B, interestingly, all of two or more different types of crystallization behaviors (white spots and fine gray spots in the periphery in FIG. 5B) occurred under the intentionally focused electron beam, in the metallic glass of the present disclosure having multiple atomic-scale cluster resetting cores. As such, it can be identified that the metallic glasses having multiple atomic-scale cluster resetting cores of the present disclosure showed unique microstructure characteristics and responses to external stimuli.

Furthermore, the metallic glass of the present disclosure may further include an element group (e) having a positive (+) enthalpy of mixing with both the element group (a) and the element group (b) to form both an (a)-(b) cluster resetting core and an (e)-centered cluster resetting core, or an element group (f) having a negative (−) enthalpy of mixing with both the element group (a) and the element group (b) to form both an (a)-(b)-(f) cluster resetting core and an (f)-(a) cluster resetting core. ((a)-(b)-(f) means an atomic cluster containing all the elements of the element group (a), the element group (b), and the element group (c), and similarly, (a)-(f) means a cluster formed between the element group (a) and the element group (f).) In Table 1 below, Elements 1 to 12 are the elements Nb, Mo, Ta and W, and the elements C, N, Si, P, Ge, Pd, Pt, and Au, which respectively constitute the element group (e) and the element group (f) defined through the aforementioned enthalpy of mixing among the constituent elements. The elements easily form stable precipitation phases when alloyed at excessive amounts, and thus the elements are preferably alloyed at 5 at. % or less relative to the total alloying elements.

TABLE 1

| Classification | Atomic number | Element | $\Delta H_{mix, Zr}$ (J/mol) | $\Delta H_{mix, Cu}$ (J/mol) | Element group | Structure |
| --- | --- | --- | --- | --- | --- | --- |
| Element 1 | 41 | Nb | 4 | 3 | e | Amorphous |
| Element 2 | 42 | Mo | 19 | 6 | e | Amorphous |
| Element 3 | 73 | Ta | 2 | 3 | e | Amorphous |
| Element 4 | 74 | W | 22 | 9 | e | Amorphous |
| Element 5 | 6 | C | −131 | −33 | f | Amorphous |
| Element 6 | 7 | N | −233 | −84 | f | Amorphous |
| Element 7 | 14 | Si | −84 | −19 | f | Amorphous |
| Element 8 | 15 | P | −127.5 | −17.5 | f | Amorphous |
| Element 9 | 32 | Ge | −72.5 | −11.5 | f | Amorphous |
| Element 10 | 46 | Pd | −91 | −14 | f | Amorphous |
| Element 11 | 78 | Pt | −100 | −12 | f | Amorphous |
| Element 12 | 79 | Au | −74 | −9 | f | Amorphous |

As described above, the alloys of the present disclosure are advantageous when multiple atomic-scale cluster resetting cores are formed through the maximization of the complexity of the enthalpy of mixing among constituent elements, and therefore, the alloy of the present disclosure preferably contains at least one species of element from each of at least three element groups among the element group (c), the element group (d), the element group (e), and the element group (f).

Figure 6:
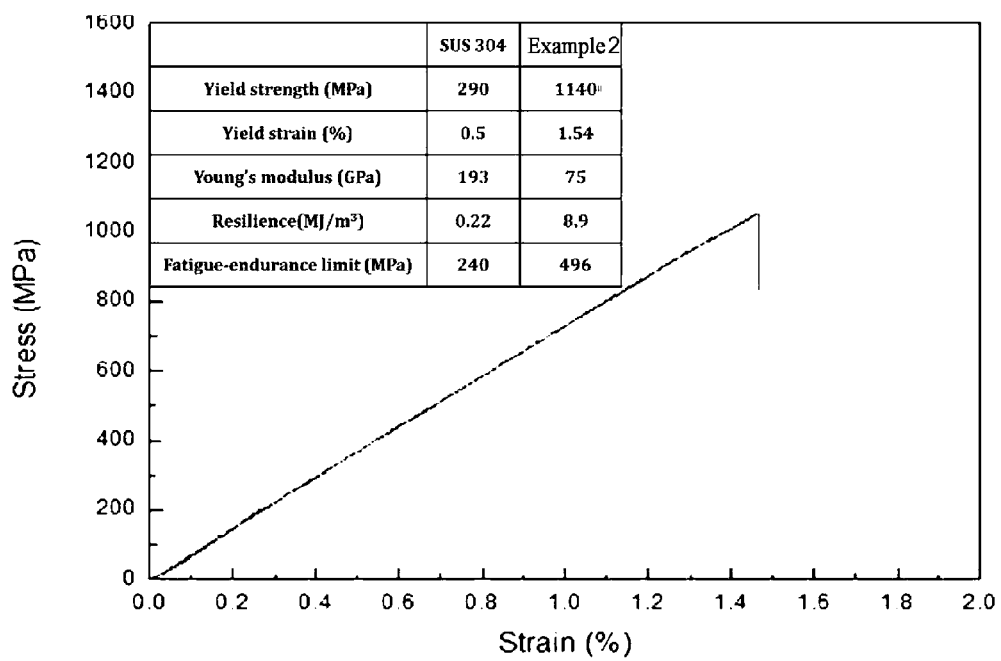
FIG. 6 is a stress-strain curve for Example 2 among the resettable metallic glasses of the present disclosure.

FIG. 6 is a stress-strain curve obtained through a tensile test for Example 2 among the resettable metallic glasses of the present disclosure. Example 2 is an alloy in which the ratio of Zr and Fe and Co was Zr:Fe:Co=58:14:28 at. % and 1 at. % of Y of the element group (c), 5 at. % of Al of the element group (d), and 2 at. % of Nb of the element group (e) were further added thereto. The mechanical property values obtained for Example 2 are summarized in the table inserted in FIG. 6 and compared with the values reported for SUS 304. As can be seen from the drawing, Example 2 was identified to have a strength of 1.140 GPa ($\sigma_y$, three times or more compared with SUS 304), elastic strain of 1.54% (three times or more compared with SUS 304), and a resilience ($U=\sigma_y^2/2E$, E is Young's modulus) of 8.9 MJ/m$^3$ (40 times or more compared with SUS 304), and thus it was therefore identified that Example 2 had at least two times the fatigue fracture resistance of SUS 304 alloy. As such, the resettable metallic glass of the present disclosure had strength of 1 GPa or more, yield strain of 1.5% or more, and resilience of 5 MJ/m$^3$, and thus had excellent mechanical properties compared with base materials constituting existing gears.

The resettability of the metallic glass of the present disclosure having multiple atomic-scale cluster resetting cores will be described in detail through Table 2 below. A resetting process may be performed by additionally applying various types of external energy. Herein, process conditions for optimizing resettability in the metallic glasses were intended to be presented on the basis of the thermo-cycling process in which energy was repeatedly applied to Example 3 with the temperature changing between cryogenic and high temperatures. Example 3 is an alloy in which the ratio of Zr and Ni was Zr:Ni=62:38 at. %, and 7.5 at. % of Be of the element group (d) was further added thereto. The temperature environment change can easily provide complex environments, such as (1) thermal energy application by the temperature change and (2) local mechanical energy application by repetition of expansion-contraction of bonds between atoms, and thus is advantageous in the resetting process. Apart from these, the application of external energy may be performed by an external force including mechanical, electric, thermal, or magnetic energy, equivalent to the aforementioned thermo-cycle conditions.

In general, the defects in the amorphous structure form into shear transformation zones (STZs) by the site exchange through atomic diffusion of constituent elements, and then develop into the formation of shear bands through the connection between activated STZs. Therefore, through the elimination of the activated STZs occurring under repeated stress, the microstructure recovery and the resetting of the metallic glass can be attained. The relative amount of activated STZs (or soft spots) in the amorphous structure may be checked by differential scanning calorimetry. Specifically, the activated STZs are generally known to have a high energy state, and thus when the amount of activated STZs in the amorphous matrix increases after repeated use, the gentle exothermic reaction curve becomes large at a low temperature not higher than the crystallization temperature and the size of the curve becomes reduced after the resetting process of healing detect regions, in the DSC synthesis.

TABLE 2

| Classification | Resetting process conditions | | | | ΔH (J/mol) | | Note |
| | Minimum temperature (° C.) | Maximum temperature (° C.) | Number of repetitions | Retention time (s) | Energy (E) | Variation (ΔE) | |
| --- | --- | --- | --- | --- | --- | --- | --- |
| Condition 1 | — | — | — | — | −100.3 | — | as-cast |
| Condition 2 | — | — | — | — | −5.8 | — | relaxed |
| Condition 3 | — | — | — | — | −408.5 | — | fatigued |
| Test conditions (resettable metallic glass - Example 3) | | | | | | | |
| Condition 4 | −20 | 100 | 30 | 60 | −376.5 | 32.0 | — |
| Condition 5 | −50 | 100 | 30 | 60 | −222.7 | 185.8 | — |
| Condition 6 | −100 | 100 | 30 | 60 | −149.7 | 258.8 | — |
| Condition 7 | −200 | 100 | 30 | 60 | −130.6 | 277.9 | — |
| Condition 8 | −100 | 25 | 30 | 60 | −315.2 | 93.3 | — |
| Condition 9 | −100 | 150 | 30 | 60 | −135.6 | 272.9 | — |
| Condition 10 | −100 | 200 | 30 | 60 | −139.8 | 268.7 | — |
| Condition 11 | −100 | 100 | 1 | 60 | −374.7 | 33.8 | — |
| Condition 12 | −100 | 100 | 5 | 60 | −175.2 | 233.3 | — |
| Condition 13 | −100 | 100 | 100 | 60 | −137.6 | 270.9 | — |
| Condition 14 | −100 | 100 | 30 | 10 | −284.3 | 124.2 | — |
| Condition 15 | −100 | 100 | 30 | 20 | −153.9 | 254.6 | — |
| Condition 16 | −100 | 100 | 30 | 300 | −159.2 | 249.3 | — |
| Comparison conditions (typical metallic glass -Comparative Example 1) | | | | | | | |
| Condition 17 | — | — | — | — | −321.8 | — | Comparative Example 1 (fatigued) |
| Condition 18 | −100 | 100 | 30 | 60 | −274.7 | 47.1 | Comparative Example 1 |

Figure 7:
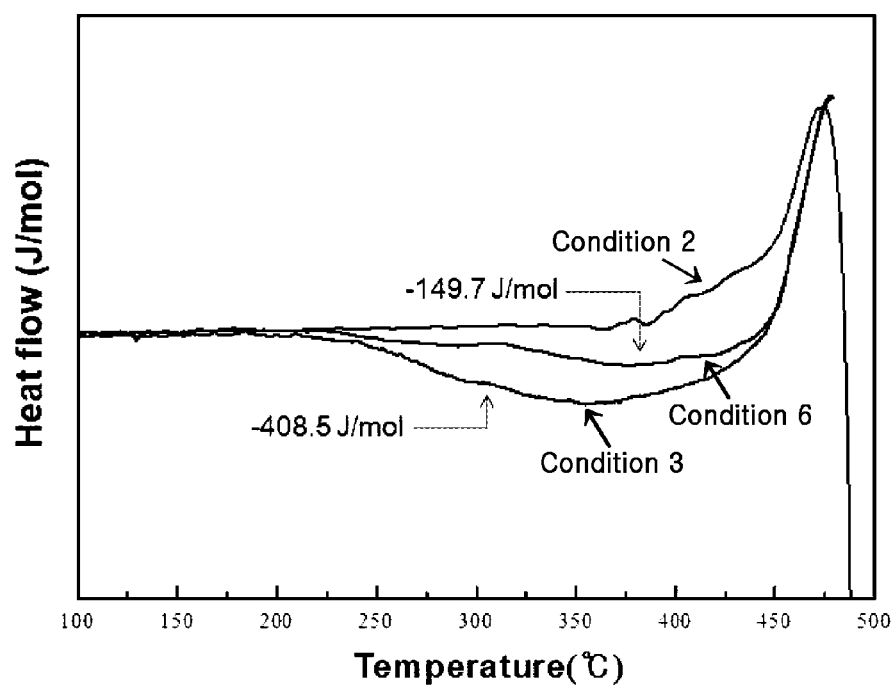
FIG. 7 shows the differential scanning calorimetry (DSC) results for specimens obtained by treating the composition of Example 3 according to the present disclosure with Condition 2, Condition 3, and Condition 6.

Condition 1 shows the results of DSC measurement immediately after Example 3 was manufactured. When such a metallic glass was heated at a temperature of 70% or more of the glass transition temperature, the STZ regions formed during the manufacturing of the alloy were decreased, and in the DSC analysis, the ΔH value of the energy region showing a gentle exothermic reaction at a low temperature not higher than the crystallization temperature was decreased. That is, the amorphous structure of the alloy could be estimated by confirming the change in ΔH value in this section. The ΔH value was obtained by calculating the exothermic peak area before the crystallization temperature on the DSC curve as shown in FIG. 7.

Specifically, when a specimen having the composition of Example 3 was manufactured, the ΔH value was about −100.3 J/mol as shown in Table 2. This energy may be determined to be caused by a liquid-like region necessarily occurring during the formation of an amorphous structure. However, when such a metallic glass was heated for 10 minutes at 350° C., which was about 0.8 times the glass transition temperature of the corresponding metallic glass, this value was very decreased to about −5.8 J/mol, approaching zero (FIG. 7, Condition 2). However, when such a material received stress in a use environment, ΔH increased with an increased amount of STZs. For verification thereof, in the present disclosure, specimens obtained by subjecting the developed alloy to deformation within the critical deformation was post-treated under different resetting process conditions, and then a fatigue fracture test was performed. As a result, the STZ regions in the alloy increased with increasing number of fatigue test cycles, and in DSC analysis, ΔH of the energy region showing a gentle exothermic reaction at a low temperature not higher than the crystallization temperature was about 408.5 J/mol (after 50% of maximum fatigue cycle), indicating a large increase compared with the As-cast state (FIG. 7, Condition 3). These results indicate that the active utilization of the structural stabilization heat treatment is needed for effective control of resettability.

On the basis of Conditions 4 to 16 on the table, the resetting process conditions of the present disclosure were defined below. The resetting process was performed by repeatedly applying a low-temperature environment (minimum temperature) and a high-temperature environment (maximum temperature) to the material with maximized STZ region due to the concentration of fatigue stress for a predetermined time (retention time). The relative change of the STZ region was checked by the ΔH value, wherein the magnitude (variation, ΔE) of the value was evaluated based on the ΔH value in Condition 3.

First, as for Conditions 4 to 7, the results were investigated while the minimum temperature of the resetting process was changed. As shown in the table, the minimum temperature was −20° C., too high, and thus when sufficient energy cannot be applied to materials, ΔE was 32 J/mol. However, as the minimum temperature was lowered to −50° C. or more, the effect thereof was increased, showing a ΔE value of 185.8 J/mol or more. This value was 50% or more of 308.2 J/mol, which is ΔE between the as-cast alloy of Condition 1 and the fatigued alloy of Condition 3, indicating great resettability. Therefore, the minimum temperature as a process condition of the present disclosure is preferably −50° C. or lower. The difference of two energy values was not determined as 308.2 J/mol, and the characteristic value varies according to the alloy system or the degree of fatigue deformation. This standard value was denoted as $\Delta E_c$, and in the present disclosure, the ratio (percentage) of ΔE and $\Delta E_c$ generated during each process was defined as a resetting rate.

Next, as for Conditions 8 to 10, the results for changing the maximum temperature of the process were shown. Also from these results, a very small amount of ΔE occurs when the maximum temperature was too low, the room temperature level, and thus the treatment was preferably performed at a temperature of at least 100° C. However, when the resetting process is performed at 0.7 or more of the glass transition temperature ($T_g$) determined according to the alloy, the structural relaxation may occur, resulting in the state as in Condition 2, and thus the resetting process is preferably performed at this temperature or lower.

Then, Conditions 11 to 13 shows the results of controlling the number of repetitions of the resetting process. The number of repetitions refers to the number of repetitions of one cycle in which an alloy prepared at room temperature was transferred once from a low-temperature condition to a high-temperature condition and then air-cooled to room temperature. As can be seen from the results, fewer than five repetitions showed little effect on resetting, and only at least five repetitions showed a value of 50% or more of $\Delta E_c$.

Last, Conditions 14 to 16 shows the results of controlling the retention time of the resetting process. The retention time had a less influence compared with other variables, but when the retention time was shorter than 20 seconds, the temperature stabilization through conduction was insufficient throughout the specimen, resulting in a large reduction in process efficiency. Therefore, the time for one time of resetting process is preferably limited to at least 20 seconds. When a metallic glass in a metastable phase was maintained at a high temperature for too long, undesirable structural relaxation behavior may occur or a crystalline phase may be formed. Therefore, it is not preferable to perform the process for 1 hour or longer.

Conditions 17 and 18 show the results of thermal analysis of a fatigue deformation region obtained after fatigue fracture of the metallic glass of Comparative Example 1 (Condition 17) and the specimen of Condition 17 combined with Condition 6, subjected to a resetting process (Condition 18). As can be seen from the results, in spite of the application of the resetting process (Condition 6) producing a resetting rate of 83% or more in the specimen of Example 3, the resetting was made at a resetting rate of 15%, corresponding to a low level, for the composition of Comparative Example 1.

It can be seen from these results that high-efficiency resetting behavior is not usually expressed in existing metallic glasses, but is restrictively possible in only the alloy systems of the present disclosure having multiple atomic-scale cluster resetting cores. In the present description, for experimental convenience, the resetting optimization process was limited to the alloy of Example 3 selected as a representative alloy, but the alloys of the present disclosure have similar amorphous structures having multiple atomic-scale cluster resetting cores, and thus it should be recognized that the above-described resetting occur in all the developed compositions.

Manufacturing of Resettable Gears

Gears are machine parts designed to continuously transmit force or power while rotating by meshing the teeth thereof in pairs on frictional contact surfaces rotating with each other. Gears are widely used parts in machinery and industrial fields since the gears can accurately transmit more power at a constant speed ratio when the distance between two axes is short. These gears can be variously classified according to the relational positions of two axes, the materials used, the shapes and sizes of the gears, contact manner of teeth, the operation manner, and the like, and the gears of the present disclosure include various types used as power transmission devices.

In the present disclosure, gear forming using a resettable metallic glass as a base material will be described in detail by exemplifying a strain wave gear, which is a type of worm gear belonging to non-parallel and non-interesting axis gears, which has recently been receiving much attention.

Figure 8A:
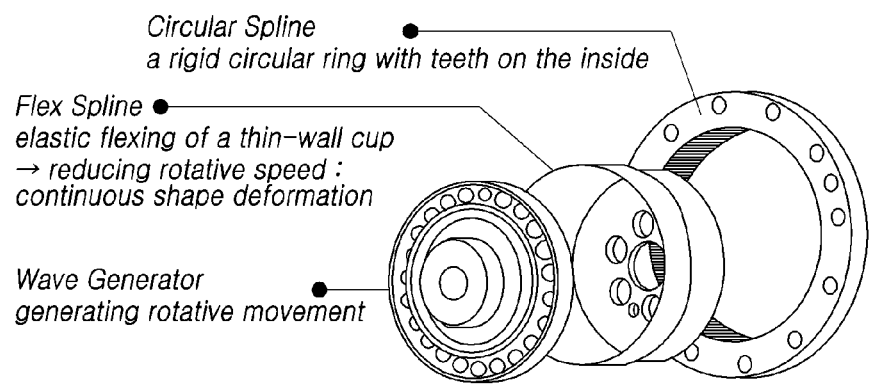
FIG. 8A to FIG. 8C depict images of a main constituent part (FIG. 8A), a flex spline blank gear (FIG. 8B), and a completed flex spline (FIG. 8C) in a strain wave gear, which is a type of worm gear in non-parallel and non-intersecting gears.

However, this is merely for ease of explanation, and the present disclosure is not limited to the examples. As shown in FIG. 8A, a strain wave gear is configured of (1) a wave generator, (2) a flex spline (FS), and (3) a circular spline (CS), which drive a gear, and the wave generated due to a difference in number of teeth between FS and CS transmits force.

The gear may be manufactured by a two-step process. Specifically, the process includes the steps of: (1) forming an outer shape part determining the overall shape of the gear, that is, a blank gear; and (2) precisely forming teeth of the gear. The steps will be described in detail below.

Forming Outer Shape Part of Gear (Blank Gear)

Figure 8B:
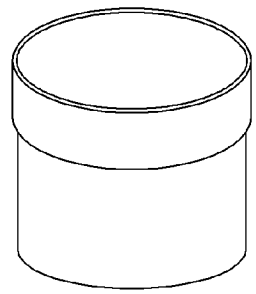

The forming of an outer shape part (blank gear) by applying a resettable metallic glass to the gear in the present step will be described. The blank gear determines the overall outer shape of the gear as shown in the shape of the FS shown in FIG. 8B, and indicates the state before the teeth of the gear are formed.

As for the forming of such a blank gear, the blank gear may be manufactured by: direct casting, such as drop casting, pressure casting, die casting, or centrifugal casting, in which a master alloy manufactured with a target composition was directly poured into a casting mold with a blank gear form; or by thermo-plastic forming, such as thermo-forming (heat+mechanical stress) or blow molding (heat+air pressure), in which the base material prepared in an amorphous structure is subjected to forming through pressurization at a temperature not higher than the crystallization temperature.

As for drop casting as an example of the forming of the blank gear, a master alloy manufactured with a target composition is melted, and the molten metal is allowed to flow into a mold with a desired shape by gravity, thereby manufacturing the blank gear. As for the preparation of the molten amorphous metal, commonly used melting processes including arc melting and induction melting may be utilized, and the molten amorphous metal flowing into the mold by gravity finally follows the shape of the mold. Such drop casting is a technique that is typically used in the manufacture of metallic glasses.

Figure 9:
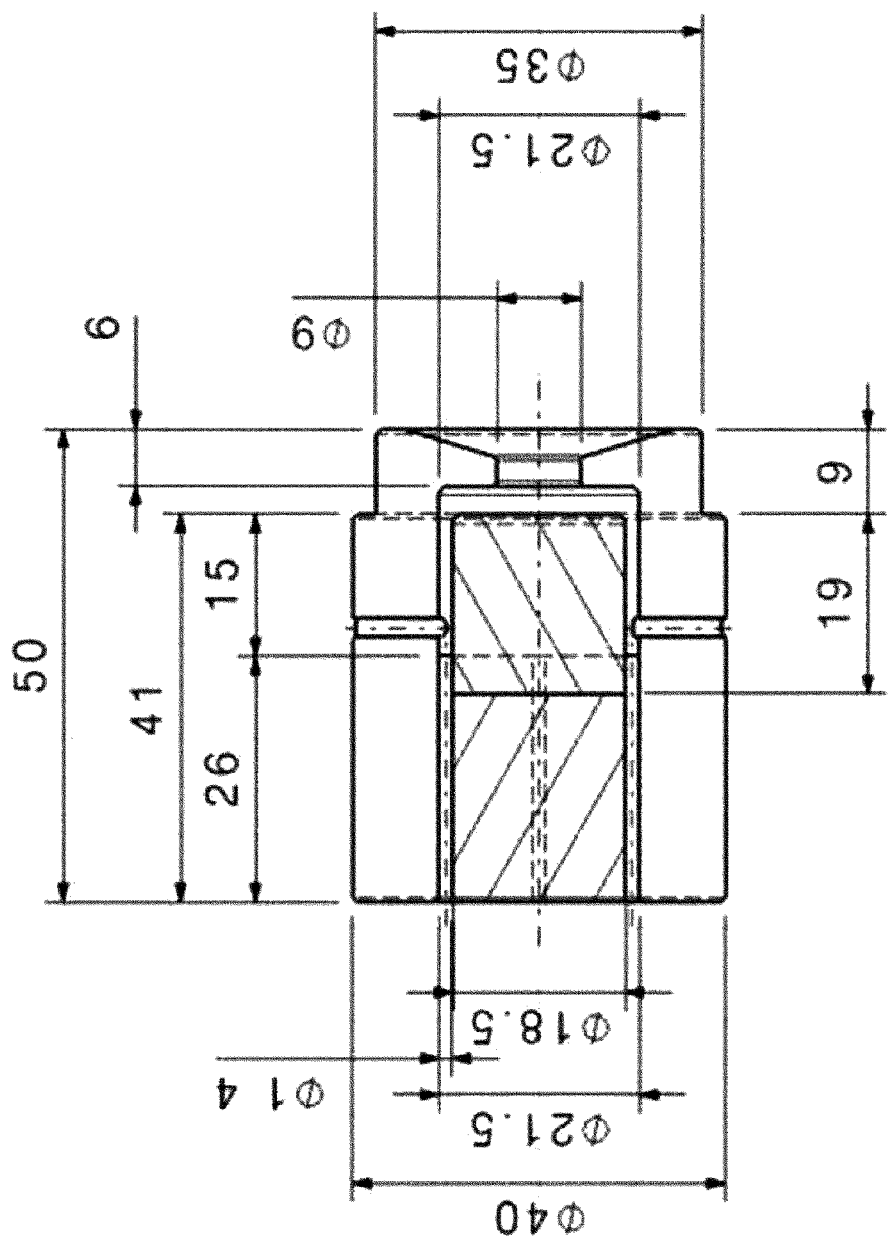
FIG. 9 is a detailed diagram showing the shape and dimensions of a mold for drop casting of flex spline of a strain wave gear utilized as an exemplary embodiment in the present disclosure.

Hereinafter, a method of manufacturing the blank gear constituting FS of a stain wave gear according to an exemplary embodiment of the present disclosure will be described by using as a representative example drop casting. FIG. 9 is a detailed diagram showing the shape and dimensions of a mold for drop casting of FS of a strain wave gear employed as an exemplary embodiment in the present disclosure. The casting mold was manufactured of a copper alloy with high thermal conductivity, and this mold was water-cooled to implement the cooling rate for forming an amorphous structure. As shown in FIG. 10A, the mold was configured of a total of three parts. First, the mold was configured of: a portion that configures the overall outer shape of the mold (100, named part 1 configured of the upper end portion constituting a molten body support and the lower end portion constituting the outer diameter part); a portion in which a copper rod is placed for securing a filling space and increasing cooling efficiency (200, named part 2); and a portion determining the height of the blank gear (300, named part 3). The size of part 1 determined the outer diameter of the blank gear (5 mm to 500 mm), and had two degassing holes for favorable filling of the molten metal. The thickness of part 2 determined the thickness of the cup-shaped outer wall of the blank gear (0.5 mm to 5 mm). The size of part 3 determined the height of the blank gear (5 mm to 150 mm), and had four degassing holes for favorable filling of the molten metal. In each of the parts, less than two degassing holes prevents the smooth filling of the molten metal, and more than six degassing holes increases the loss of the molten metal, and thus are not preferable.

The completely molten master alloy with the target composition was poured and cooled in the aforementioned mold to form a cup-shaped amorphous casting body constituting the FS blank gear in the space between part 1 and part 2. The cooling of the molten metal is preferably performed at a cooling rate of 10 K/s or more to facilitate the formation of an amorphous structure. The manufactured amorphous casting body will be described in detail with reference to FIGS. 9 and 10. The manufactured amorphous casting body was cast in a cup shape with an inner diameter of 18.5 mm, an outer diameter of 21.5 mm, and a bottom thickness of 3 mm. The casting body was primarily manufactured in a state in which a copper rod (200, FIG. 10A), having a diameter of 18.5 mm was charged inside the metallic glass, and the copper rod inside was removed, thereby finally manufacturing the blank gear. The X-ray diffraction analysis results of the manufactured casting body, as shown in the bottom part in FIG. 10B, indicated a typical halo pattern obtainable from an amorphous phase.

The blank gear cast through the above step has a casting defect, such as surface roughness formed during casting. Therefore, a final blank gear may be obtained by further including a step of processing the surface or inside on the blank gear manufactured in the above step. As the processing method, a computerized numerical control (CNC) lathe processing method using a carbide tip coated with a high-hardness material, such as TiN, may be employed. In the lathe processing, 500-2000 rpm was maintained although different depending on the site, and in order to prevent the crystallization due to the heat generated during processing and the damage due to thermal expansion, cooling was performed using non-aqueous cutting oil. In particular, the copper rod initially charged into the casting body preferably provided a grip during post-processing of the manufactured cup-shaped amorphous casting body, thereby increasing processing efficiency. Through such additional processing, the FS blank gear casting body manufactured as in FIG. 10B can be formed into the final form of blank gear as in FIG. 8B.

The above method is considered to be also usable in the same manner when manufacturing not only FS of a strain wave gear, simply configured of a metallic glass as a base material, but also CS, and furthermore various shapes of blank gears. The drop casting may be replaced with press casting or die casting in which pressure is applied before and after the injection of the molten metal, or centrifugal casting in which centrifugal force is applied with a mold rotating.

The forming of the outer shape (blank gear) to which the resettable metallic glass of the present disclosure is applied may be attained by cooling after thermo-plastic forming, such as thermo-forming (heat+mechanical stress) or blow molding (heat+air pressure), in which a base material prepared in an amorphous structure is processed through pressurization at a temperature not higher than the crystallization temperature. Such thermo-plastic forming is a method wherein forming is performed by pressurization in a mold at a temperature not higher than the crystallization temperature through the use of the viscous flow activated from a temperature of 70% of the glass transition temperature (Tg), which is the characteristic temperature of an amorphous material, thereby ensuring the control of surface roughness and the securement of dimensional accuracy. In thermo-plastic forming of the resettable metallic glass of the present disclosure, the alloys of the present disclosure are vulnerable to high-temperature oxidation, and thus it is preferable to secure a sufficiently low viscosity of $10^{10}$ Pa·s or less by maintaining the amorphous base material at a temperature of $Tg+\Delta T_x (=T_x-T_g)/2$ to $T_x$ (crystallization initiation temperature) under conditions in which an inert gas of argon or nitrogen is filled in a low vacuum range of 10 to $10^3$ after securing a vacuum degree of 0.1 Torr or more.

Precisely Forming Teeth of Gear

In this step, the precise forming of the teeth of the gear by utilizing the blank gear manufactured through the forming of the resettable metallic glass will be described. The forming of teeth on the blank gear may be considered to be a most important step in determining the characteristics of the gear.

As for the precise forming of the teeth of the gear, the blank gear, which is the manufactured outer shape part, may be subjected to forming through at least one method of cutting, such as electric discharging machining or twin-roll processing, or thermo-plastic forming, such as blow molding (heat+air pressure) or thermo-forming (heat+mechanical stress).

Figure 11:
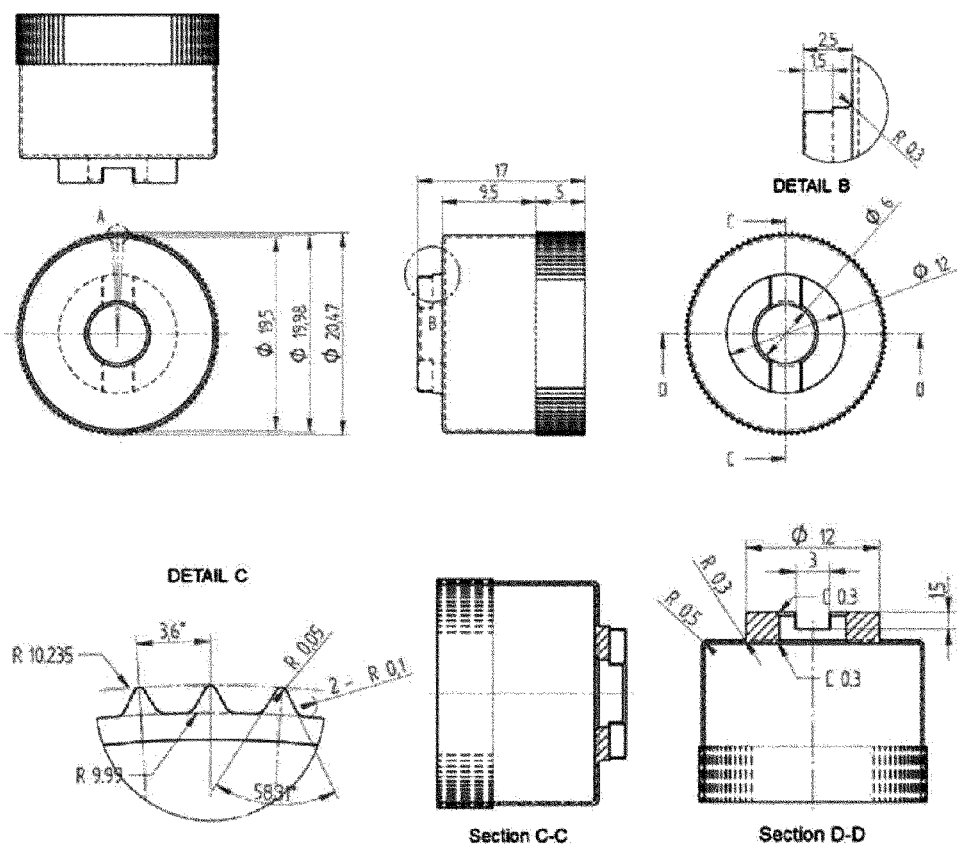
FIG. 11 is a detailed diagram showing the shape and dimensions of each part of the flex spline of a strain wave gear, measured according to an exemplary embodiment in the present disclosure.

First, in the present disclosure, the precise forming of the FS teeth of the strain wave gear will be described by using, as a representative example, electric discharging machining, which is an example of precise forming of the teeth of the gear. FIG. 11 is a detailed view of the external shapes and dimensions of the FS teeth processed in the present disclosure. As can be seen from the drawing, the FS teeth of the present disclosure have an interval of 3.6° between teeth and tooth R=0.05 and tooth angle of 58.31°, and thus require precise forming. In the electric discharging machining, the machining was performed by applying a current to the 64 brass wire with a diameter of 0.1 mm to 1.0 mm according to the drawing, and the power used for machining was controlled not to exceed 1 kW since the amorphous base material may be crystallized by heat generated during electric discharging machining. Such a method can be very usefully utilized to machine an amorphous material that is vulnerable to external mechanical forces. Additionally, various types of grinding surface treatment may be performed to control the surface roughness. The blank gear shown in FIG. 8B was machined as such, thereby manufacturing the final gear as shown in FIG. 8C.

Figure 8C:
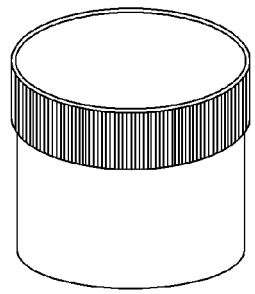
Figure 12A:
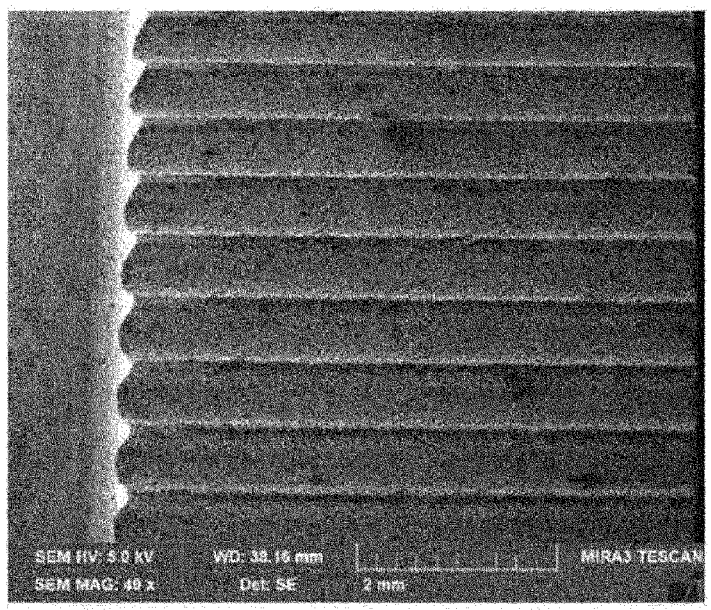
FIG. 12 depicts a scan electron microscopy image showing an enlargement of teeth of the flex spline of a resettable strain wave gear manufactured in the present disclosure (FIG. 12A) and a scan electron microscopy image showing an enlargement of a meshing degree of the flex spline with the circular spline (FIG. 12B).
Figure 12B:
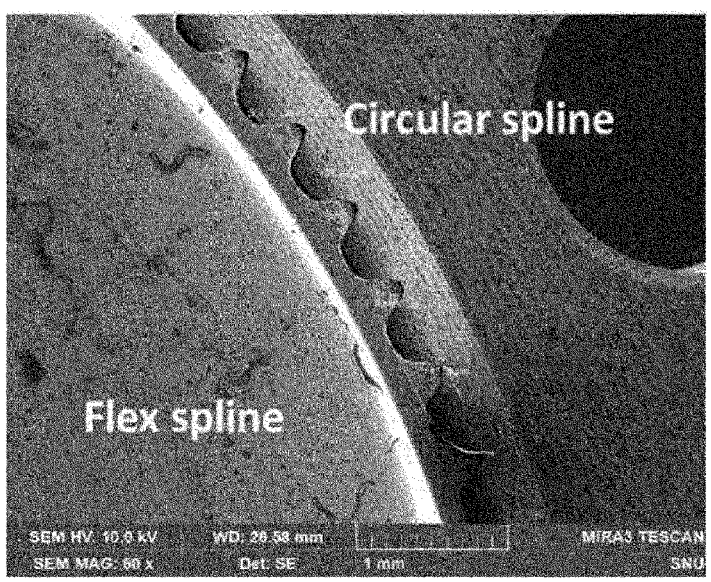

FIG. 12 is an enlarged view of a machined state of the teeth of the gear, to which the resettable metallic glass was applied, in FIG. 8C. As shown in FIG. 12A, the machined gear teeth had a very uniform shape, and as shown in FIG. 12B, the machined FS teeth could have favorable meshing behavior with CS. The dimensional accuracy of the manufactured teeth was about 1 μm, indicating that tooth machining was attained with favorable dimensional accuracy maintained. This means that the resettable gear of the present disclosure can be successfully machined through the method as above. In particular, precision machining is generally more difficult to machine into small sizes, and thus the machining into the sizes not smaller than the teeth of the present disclosure can be determined to be attained by the machining method of the present disclosure. Such precision forming of the teeth of the gear as above may be performed by twin-roll processing. In twin-roll processing, a processing roller having a tooth mold with a desired shape is rotated outside while the blank gear is rotated, and thus fast and precise processing can be performed. When such twin-roll processing is performed, the viscosity of a material has a great influence on the dimensional accuracy, and thus when the resettable metallic glass of the present disclosure is processed, the temperature needs to be controlled to raise to up to a temperature of 70% or less of the glass transition temperature of the amorphous material.

In addition, the utilization of the thermo-plastic forming can attain the manufacture of the teeth as well as the blank gear as described above. Therefore, the already manufactured blank gear may be subjected to thermo-plastic forming by pressurization in a mold with a desired tooth shape, thereby producing a very precise gear.

Optimizing Resettability of Gear

The step of optimizing resettability of the manufactured gear will be described in detail. The resettable gear of the present disclosure was formed by processing the metallic glass as described above, and thus structural relaxation of the material to some extent is performed after the manufacturing of the gear. Therefore, for the optimization of the resettability of the resettable gear of the present disclosure, the manufactured alloys is preferably subjected to two-stage heat treatment. The two-stage heat treatment of the present disclosure include a relaxation treatment as a first stage and a resetting treatment as a second stage, which are performed on the metallic glass manufactured by rapid cooling.

As for the relaxation treatment as the first stage, STZ regions that are inevitably formed during casting can be completely eliminated by performing a heat treatment on the metallic glass at a temperature not higher than the glass transition temperature. Actually, as shown in Table 2 and FIG. 7 according to the present disclosure, when the alloy immediately after being manufactured (Condition 3) is subjected to a heat treatment, all the energy existing therein disappeared as in Condition 2. Such a first-stage heat treatment may be performed by a heat treatment at a temperature lower than the glass transition temperature defined for each alloy composition and a heat treatment at a temperature of at least 70% of the glass transition temperature ($0.7\ T_g$). When such a heat treatment is performed too long, crystallization may occur due to the metastability of the amorphous structure, and thus the heat treatment is advantageously performed for 60 minutes or shorter due to the possibility of crystallization or advantageously performed for 10 seconds or longer in consideration of heat transfer of the material.

To increase STZ regions or maximize the metastability inside the alloy subjected to the first-stage heat treatment, the alloy may be subjected to a resetting treatment as a second-stage heat treatment. The resetting treatment plays a role of increasing the internal energy of a material itself and can maximize the efficiency of a resetting process. Such a resetting treatment may be performed by a method including the application of mechanical deformation, thermo-cycle, electric energy, magnetic energy, and the like, at a level of avoiding material crystallization or fracture. The application of energy may increase the internal energy as shown in Conditions 3 and 6 in FIG. 7. Specifically, a thermo-cycling process is performed at least five times, in which an environment for the application of external energy at −50° C. or lower and an environment for the application of external energy at 100° C. or higher are alternately operated for at least 20 seconds. In addition, the application of external energy for such a two-stage treatment process may be performed by an external force including mechanical, electric, thermal, or magnetic energy at a level equivalent to the aforementioned thermo-cycling condition.

Figure 13:
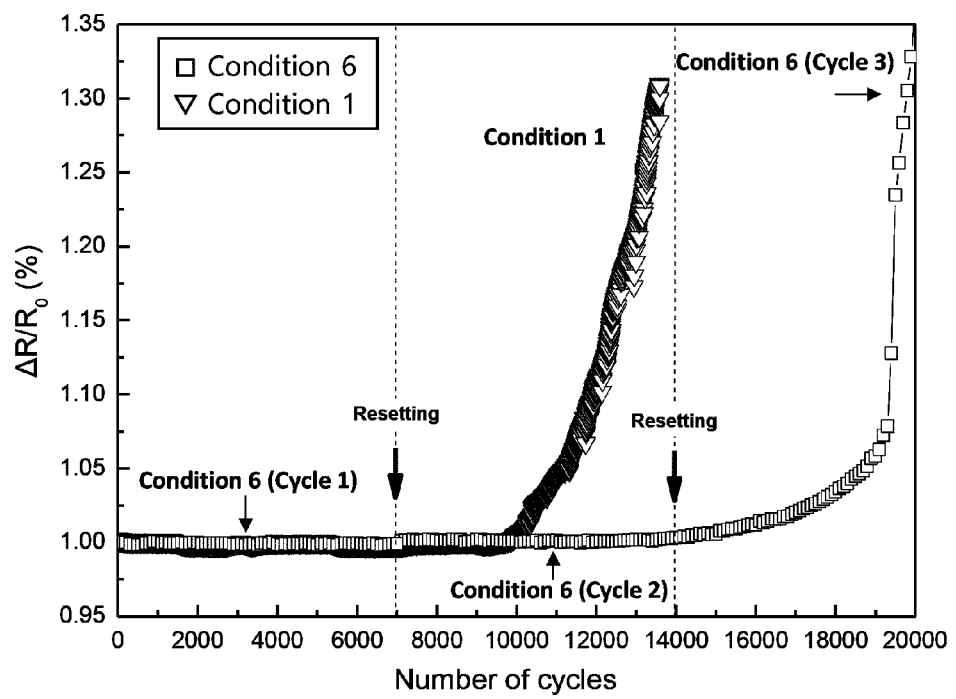
FIG. 13 shows the results of a fatigue test on the as-cast specimen (Condition 1) of the gear manufactured of the composition of Example 3 of the present disclosure and the specimen obtained by performing a resetting treatment of Condition 6 on the gear after 50% deformation of the maximum fatigue deformation.

FIG. 13 shows the results of a fatigue test on the as-cast specimen (Condition 1) of the gear manufactured of the composition of Example 3 of the present disclosure and the specimen obtained by repeatedly performing a resetting treatment of Condition 6 on the gear after 50% deformation of the maximum fatigue deformation. (The detailed conditions being described in Table 2 above). The drawing shows that the resistance of materials changed according to the number of fatigue fracture cycles. As can be seen from the drawing, the fatigue cracks are generated due to increased defects and gradually propagate, thereby sharply increasing the resistance of the materials. Therefore, the as-cast specimen of Example 3 (Condition 1) was fractured after undergoing about 14,000 cycles of fatigue stress. Especially, it can be identified that at about 10,500 cycles (=75% of the number of fracture cycles) or more, the electrical resistance was significantly increased through an abrupt increase in internal defects. Considering this matter, in the present disclosure, the corresponding alloy allowed to undergo up to 7,000 cycles of fatigue stress, which corresponds to 50% of the number of fracture cycles (red), and then subjected to the resetting process of Condition 6. When such a developed metallic glass was repeatedly subjected to the resetting treatment, the metallic glass was deformed by 20,000 cycles or more exceeding 14,000 cycles corresponding to the original lifespan of the material (Condition 6 cycle 2). The resetting treatment of Condition 6 may be repeatedly performed, and three times of resetting treatment can ensure a material lifespan of more than 28,000 cycles, corresponding to two times or more the initial material lifespan, and ten times of resetting treatment can ensure a material lifespan of more than 140,000 cycles, corresponding to five times or more the initial material lifespan. Therefore, by repeatedly performing the resetting process according to the present disclosure, the fatigued deformation region occurring in the material can be effectively eliminated, leading to long lifespan.

While the exemplary embodiments of the present disclosure have been described above, the embodiments are only examples of the present disclosure, and it will be understood by those skilled in the art that the present disclosure can be modified in various forms without departing from the technical spirit of the present disclosure. Therefore, the scope of the present disclosure should be determined on the basis of the descriptions in the appended claims, not any specific embodiment, and all equivalents thereof should belong to the scope of the present disclosure.

What is claimed is:

1. A resettable gear comprising a resettable metallic glass, wherein the resettable metallic glass comprises:
   at least one metal element selected from (a) a group consisting of Ti, Zr, and Hf;
   at least one metal element selected from (b) a group consisting of Fe, Co, Ni, Cu, and Zn;
   at least one element selected from (c) a group consisting of Sc, Y, La, Pr, Nd, Sm, Gd, Dy, Ho, and Er, at 5 at. % or less, thereby having a complex structure with multiple atomic-scale cluster resetting cores in an amorphous matrix; and
   at least one element selected from (d) a group consisting of Be, B, Al, V, Mn, Ga, Ag, In, Sn, Pb, and Bi, at 15 at. % or less, thereby having a complex structure with multiple atomic-scale cluster resetting cores in the amorphous matrix for improvement of structural complexity thereof,
   wherein a ratio of the element of the group (a) to the element of the group (b) being 15 to 66.6 at. % to form an amorphous structure, and
   wherein the resettable metallic glass, for the improvement of structural complexity thereof, further comprises at least one species of element selected from (e) a group consisting of Nb, Mo, Ta, and W, or (f) a group consisting of C, N, Si, P, Ge, Pd, Pt, and Au, at 5 at. % or less relative to the total alloying elements.

2. The resettable gear of claim 1, wherein glass-forming ability of the resettable metallic glass is 1 mm or more.

3. The resettable gear of claim 1, wherein strength of the resettable metallic glass is 1 GPa or more.

4. The resettable gear of claim 1, wherein modulus of elastic deformation of the resettable metallic glass is 1.5% or more.

5. The resettable gear of claim 1, wherein resilience of the resettable metallic glass is 5 MJ/m3 or more.

* * * * *